United States Patent

[11] 3,543,785

[72] Inventor John F. Flory
 Morristown, New Jersey
[21] Appl. No. 720,867
[22] Filed April 12, 1968
[45] Patented Dec. 1, 1970
[73] Assignee Esso Research and Engineering Company
 a corporation of Delaware

[54] APPARATUS FOR PURGING LIQUID FROM FLEXIBLE HOSE CONNECTIONS
 9 Claims, 2 Drawing Figs.
[52] U.S. Cl. .................................................. 137/209,
 137/236, 137/433; 141/116; 222/424
[51] Int. Cl. .................................................. F17d 1/08
[50] Field of Search ........................................... 103/
 232part, 248; 114/0.5(T); 137/111, 165, 209,
 424, 425, 433, 236 (Cursory); 141/116, 119;
 166/0.5; 222/318, 424

[56] References Cited
UNITED STATES PATENTS

| | | | |
|---|---|---|---|
| 1,161,745 | 11/1915 | Springman .................. | 137/425 |
| 1,554,731 | 9/1925 | Jencick ....................... | 137/433X |
| 1,744,361 | 1/1930 | Carlisle ....................... | 103/232 |
| 2,017,767 | 10/1935 | Norman ....................... | 137/209 |
| 3,204,658 | 9/1965 | Suzuki .......................... | 137/236 |
| 3,331,404 | 7/1967 | Gehring et al. ............... | 141/119X |

Primary Examiner—Robert G. Nilson
Attorneys—Manahan and Wright and Llewellyn A. Proctor ABSTRACT: This invention relates to apparatus for purging residual liquids from loading arms, especially flexible hoses, operatively attached to pipelines used for loading and unloading liquids from containing vessels. It relates particularly to a combination wherein a liquid controlled gas valve is provided at the junction between a pipeline and flexible hose, as on location at a sea berth, to inject gas into the sea hose to displace residual liquid back to the pipeline when delivery is completed.

Patented Dec. 1, 1970
3,543,785
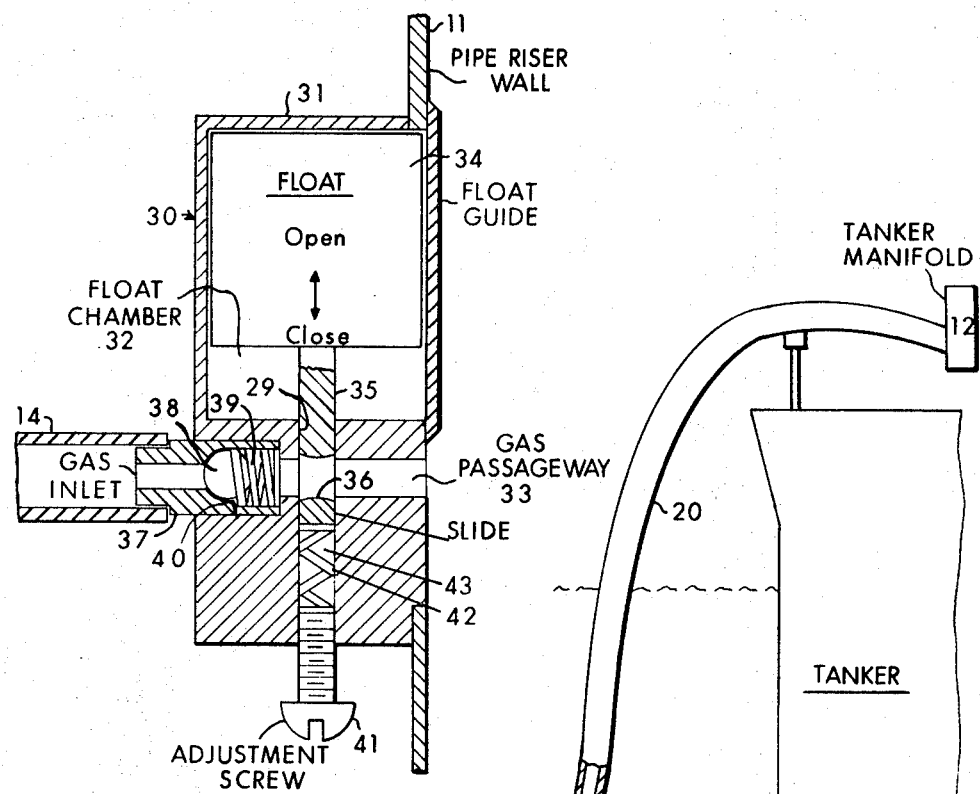
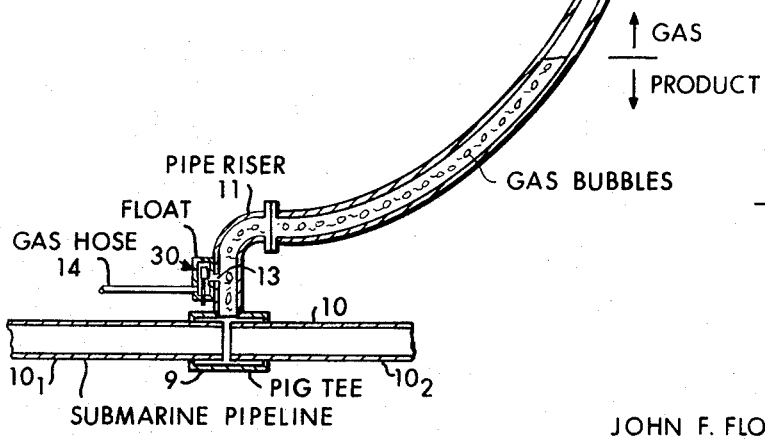
JOHN F. FLORY   Inventor
By Llewellyn A. Proctor
Patent Attorney

3,543,785

APPARATUS FOR PURGING LIQUID FROM FLEXIBLE HOSE CONNECTIONS

FIELD OF INVENTION

The valve provides, in the combination, a passageway for regulated flow of gas into the hose to initiate and cause displacement of liquid from the hose into the pipeline at the termination of the loading or unloading operation. Within the valve per se, means responsive to the action of the delivered liquid itself, preferably a float, activates means which keeps the gas passageway open. Upon completion of the delivery operation, the manifold to the delivery vessel is closed and gas injection through the valve is begun. The gas rises within the liquid-filled hose, gradually displacing the liquid which moves out of the hose and into the pipeline. The liquid responsive means, or float, which during delivery is actuated or buoyed up by the delivered liquid itself, controls secondary means which permits gas injection at will as long as liquid remains within the hose. After the liquid is forced out of the hose, however, the liquid responsive means, or float, is displaced downward to actuate means for closure of the gas passageway, this signifying the end of the loading or unloading operation.

BACKGROUND OF THE INVENTION

In loading and unloading fluids from tanks, it is often necessary or desirable to connect a main supply line or conduit via means of loading arms, riser towers, flexible hose connections, or the like. For example, in the specialized and important operation of loading a fluid into a tanker at a sea berth, it is common practice to convey the fluid to the tanker manifold via a flexible hose which is connected to a submerged pipeline from a storage terminal. After completion of the delivery, it is difficult to clean out or remove the residual liquid from the flexible rubber sea hose.

Pigging through the sea hose has proven impractical. For one reason, it is necessary to provide complex pig handling equipment on board the tanker. Thus, the equipment must either be carried with the tanker, which is expensive, or must be carried out from shore and lifted on board the tanker for the pigging operation. This is time consuming and difficult. Pigging, even so, causes excessive wear of the sea hose. For these reasons, pigging is seldom used.

Liquid can be directly displaced from the sea hose by gas under pressure. Installations have thus provided for gas applied under pressure at the tanker manifold. The gas pushes the liquid down the sea hose and back into the pipeline. This has also proven impractical. For one reason, it is necessary to provide a source of inert gas aboard the tanker. Further, there is no practical way of accurately gaging the amount of gas which must be admitted to the sea hose to just barely completely displace the liquid product back into the pipeline.

It is, accordingly, an object of this invention to obviate these and other prior art disadvantages. In particular, it is an object to provide improved apparatus for purging liquids from vertical risers, loading arms, riser towers, mooring towers, sea hoses, and the like. More particularly, it is an object to provide an improved system for offshore loading and unloading of fluid-carrying ships, or tankers, which permits considerable use of generally conventional equipment.

SUMMARY OF THE INVENTION

These and other objects are achieved in accordance with the present invention which contemplates an improved apparatus combination which permits injection of gas, via a liquid actuated gas valve, into the connecting junction between a liquid conveying pipeline and riser, e.g., a riser connection and flexible hose, at the termination of the liquid loading or unloading operation to displace residual liquid from the hose back into the pipeline.

The valve portion of the combination is located within an opening through the wall of the riser below the flexible hose connection. The opening permits ingress and egress of the conveyed liquid product to the valve to actuate means by virtue of which gas can be ejected through the valve into the riser opening from a remote location, when desired, to displace residual liquid product from the hose.

The valve per se is provided with a liquid responsive means, preferably a float located within a chamber. The float, for example, can be displaced upwardly within the chamber by ingress of liquid through the riser opening or displaced downwardly by egress of liquid through the riser opening. The float, or other liquid responsive means, actuates other means which opens or closes an adjacent passageway which is utilized for injection of gas into the riser at time of changeover from one liquid to another, or at the termination of a loading or unloading operation.

DESCRIPTION OF THE DRAWING

A preferred combination, and a best mode of operation, for practicing the present invention will be described by reference to the following detailed description which makes reference to the attached FIGS.

In the FIGS.:

FIG. 1 depicts, schematically and in cross section, a combination including a submarine pipeline, a pipe riser hose connection and float controlled gas valve, and FIG. 2 depicts an enlargement of the float controlled gas valve.

Referring generally to FIG. 1 is shown a combination which includes a submarine pipeline 10, a pipe riser 11, and a preferred type of float controlled gas valve 30 located on the wall of the pipe riser. The two lengths of the submarine pipeline $10_1$, $10_2$ are operatively coupled together by use of a pig Tee 9. The sea hose 20 is attached, at one end, to the pipe riser 11 and, at the other end to, e.g., a tanker manifold 12. An opening 13 within the wall of pipe riser 11 permits ingress or egress of the delivered liquid from the riser 11 into the chamber 32 of valve 30. A gas hose 14 is connected to gas inlet 37 of valve 30. The other end of the gas hose 14, not shown, is communicated to a source of gas which can permit remote control.

The float controlled gas valve 30 includes a housing 31 defined by enclosing walls which provide a float chamber 32, and an adjacent gas port or passageway 33. The chamber 32 is open to the pipe riser 11 via opening 13 (FIG. 1) which permits ingress and egress of liquid from the riser. The gas passageway 33, as shown, is also open to the pipe riser 11 for injection of gas into the riser. Suitably, a lateral opening 29 connects the float chamber 32 with the gas passageway 33, and therein is located a reciprocable slide 35 which contains an opening 36. The perforated slide 35 is controlled by means of the float 34 connected thereto. The control in this instance is direct, and the slide 35 is reciprocated by action of the delivered liquid upon the float 34, and counteraction of the spring 43, which moves the slide 35 up and down to open and close the passageway 33. The combination of the spring 42 and adjustment screw 41, which are fitted into the opening 43, also provides an adjustment mechanism, or means for adjusting the amplitude of movement of slide 35 for different liquids.

Suitably, the gas passageway 33 is stepped up or enlarged on the inlet side by provisions of an enlarged opening 40 into which is fitted a check valve 37. The check valve 37 can be of a conventional ball displacement type, provided with a ball 38 held in place over the inlet by action of spring 39. The ball 38 permits flow from hose 14 through the passageway 33, when the valve is open, but the check valve 37 does not permit flow in the opposite direction.

In operation, initially, the sea hose 20 is filled with liquid as when liquid is being discharged from the submarine pipeline 10 into the tanker manifold 12. In this condition, the float 34 of the valve 30 is raised to its highest position due to the buoyant effect of the liquid which fills the chamber 32. The valve is open, as shown in FIG. 2. Eventually, however, the tanker is filled, or it is desired to change over to another liquid. In any regard, it is desired to discontinue the operation and purge the sea hose 20 of liquid.

The manifold 12 is then closed, or that end of hose 20 otherwise blocked off. Gas is then injected via line 14 through gas inlet 37, opening 36 through slide 35, and through the passageway 33 of the gas valve 30. The gas rises in the form of bubbles within the pipe riser 11 and into the sea hose 20. As it does so, the liquid is gradually displaced downwardly and back into the submarine pipeline 10. This condition is shown by reference to FIG. 1. When the liquid level moves further downwardly and into the pipe riser 11, chamber 32 is emptied of liquid and float 34 is displaced downwardly to force the opening 36 of slide 35 out of alinement with gas passageway 33. This shuts off the flow of air through the gas passageway 35, or closes the valve, at which time essentially all of the product liquid has been displaced from the sea hose 20.

If desired, a spherical pig can then be passed through the submarine pipeline 10 to push the liquid from the line to storage. Only a very small amount of liquid will remain in the pig Tee 19 and at the bottom of the pipe riser 11 as a possible contaminant for future operations. After the submarine pipeline 10 has been cleaned of contaminant, the pressure in the gas hose 14 can be relieved by control means on shore and the valve 12 at the tanker manifold 12 can be opened. A second liquid can then be pumped through the system either to or from the tanker, as desired.

It is apparent that several variations are possible without departing the spirit and scope of the present invention. For example, instead of the float directly controlling the valve, indirect control means can be provided. The float might thus be used to transmit a signal back to the shore to control the gas pressure source. Other liquid-gas interface detection devices could be substituted for the float. The gas could be admitted further up the sea hose, or at the tanker manifold, and could be controlled by a liquid interface detection device at the bottom of the sea hose.

The float chamber of the valve could be within the riser itself rather than being separate, though communicated therewith. A liquid interface detection device located with the riser would thus actuate the perforated slide, through suitable means, to close the valve and shut off gas flow. The pipe riser itself could, of course, be extended to deliver liquid, or the riser connection could be coupled with a vertical riser, loading arm, riser tower, mooring tower, or the like.

I claim:

1. In combination, apparatus comprising:
 a pipeline for conveying liquid;
 a rigid riser adjoining said pipeline which provides a flexible hose connection and means for flow of the conveyed liquid between the pipeline and a connecting hose;
 an opening within the riser below the flexible hose connection;
 a gas valve located at the riser opening, said valve including:
  a housing defined by walls which enclose the riser opening to provide;
  a chamber, which opens into the riser to permit ingress and egress of liquid from the riser;
  liquid responsive means capable of sensing the level of the liquid located within said chamber;
  a passageway adjacent the chamber for flow of gas via gas inlet means into the riser; and
  a reciprocable perforated slide located across the said gas passageway so that activation of the liquid level responsive means causes actuation and movement of the slide to aline the slide opening and the gas passageway to open the valve and permit flow of gas into the riser to displace liquid back into the pipeline, and at the termination of which operation the liquid responsive means within the chamber is inactivated by egress of liquid to again actuate the slide to misaline the slide opening and the gas passageway to close off the flow of gas to the riser.

2. The apparatus of claim 1 wherein the liquid responsive means within the valve chamber is a float which rises and falls by ingress and egress of the delivered liquid.

3. The apparatus of claim 2 wherein the float is affixed to and directly actuates the slide to open and close the valve.

4. The apparatus of claim 1 wherein the gas inlet to the valve includes a check valve which assures unidirectional gas flow.

5. In combination, apparatus comprising:
 a pipeline for conveying liquid;
 a rigid riser adjoining said pipeline which provides a flexible hose connection and means for flow of the conveyed liquid between the pipeline and a connecting hose;
 an opening within the riser below the flexible hose connection;
 a float controlled gas valve located at the riser opening, said valve including:
  a housing defined by walls which enclose the riser opening to provide;
  a chamber, which opens into the riser to permit ingress and egress of liquid from the riser;
  a float, which rises and falls with the liquid level, located within said chamber;
  a passageway adjacent the chamber for flow of gas via gas inlet means into the riser;
  a lateral opening which connects the chamber and the gas passageway; and
  a reciprocable perforated slide located within the said lateral opening, said perforated slide being operatively associated with and actuated by movement of the float, whereby alinement of the slide opening with the gas passageway by upward displacement of the float permits flow of gas into the riser to displace liquid back into the pipeline, at the termination of which operation the float is displaced downward within the chamber by egress of liquid to again actuate the slide to misalign the slide opening and the gas passageway to close off the flow of gas to the riser.

6. A float operated valve which comprises in combination:
 a housing, the walls of which define a chamber having an ingress and egress port for liquid movement into and out of said chamber;
 a float disposed within said chamber and adapted to rise and fall with the level of the liquid in said chamber;
 a passageway for gas transfer into and out of said valve adjacent said chamber, said passageway laterally communicating with said chamber and also having an inlet port and an outlet port; and
 a perforated slide operatively connected at one end to said float and actuated by the movement of said float, said slide adapted to move reciprocally between said chamber and said passageway, whereby alinement and misalinement of the perforation in said slide with said passageway occurs during the reciprocal movement of said slide, and gas transfer through said valve occurs during the period of alinement only.

7. The apparatus of claim 6 wherein the gas inlet means to the gas passageway includes a check valve which assures unidirectional gas flow into the said gas passageway.

8. The apparatus of claim 6 wherein the other end of the perforated slide is extended through the housing to further accommodate a float adjustment mechanism comprising a spring which rests against that end of the slide, and an adjustment screw which holds the spring in such position, for adjusting the amplitude of movement of the slide to more readily adapt the valve to different liquids.

9. The valve of claim 6 wherein alinement of said slide occurs by the upward displacement of said float and misalinement occurs by the downward displacement of said float.